(12) United States Patent
Pionetti

(10) Patent No.: US 8,348,552 B2
(45) Date of Patent: Jan. 8, 2013

(54) FLOATING SUPPORT COMPRISING A DEVICE FOR THE RETENTION AND SECURING OF A SUBSEA PIPE

(75) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 295 days.

(21) Appl. No.: 12/739,094

(22) PCT Filed: Oct. 6, 2008

(86) PCT No.: PCT/FR2008/051805
§ 371 (c)(1),
(2), (4) Date: Apr. 21, 2010

(87) PCT Pub. No.: WO2009/053599
PCT Pub. Date: Apr. 30, 2009

(65) Prior Publication Data
US 2010/0310319 A1 Dec. 9, 2010

(30) Foreign Application Priority Data

Oct. 23, 2007 (FR) ...................................... 07 58503

(51) Int. Cl.
*F16L 1/12* (2006.01)
(52) U.S. Cl. .......................... 405/170; 405/169; 405/166
(58) Field of Classification Search .................. 405/158, 405/166, 168.1, 169, 170, 173
See application file for complete search history.

(56) References Cited

U.S. PATENT DOCUMENTS

| 4,459,930 A | * | 7/1984 | Flory ........................ 114/230.14 |
| 6,273,643 B1 | | 8/2001 | Baugh |
| 6,361,250 B1 | * | 3/2002 | de Varax ......................... 405/158 |
| 6,361,251 B1 | * | 3/2002 | Soltanahmadi et al. ...... 405/170 |
| 6,739,804 B1 | * | 5/2004 | Haun ............................. 405/169 |
| 7,942,608 B2 | * | 5/2011 | Bastard et al. ................ 405/158 |
| 2009/0202305 A1 | * | 8/2009 | Bastard et al. .............. 405/168.3 |

FOREIGN PATENT DOCUMENTS

WO WO2007/096548 8/2007

OTHER PUBLICATIONS

English translation of the Written Opinion of the International Searching Authority.
International Search Report based on PCT/FR2008/051805 dated Apr. 9, 2009.

* cited by examiner

*Primary Examiner* — Frederick L Lagman
(74) *Attorney, Agent, or Firm* — Cozen O'Connor

(57) ABSTRACT

A floating support including a retaining and holding device for retaining and holding a pipe suspended from a floating support of the type comprising a ship for laying a bottom-to-surface connection pipe. The retaining and holding device comprises at least a first collar releasably locked around an end forging of a pipe element together with a support part at the floating support, said support part including load transfer and a rotary joint enabling the inclination of the pipe to be guided and having an effect of automatically centering the pipe.

17 Claims, 6 Drawing Sheets

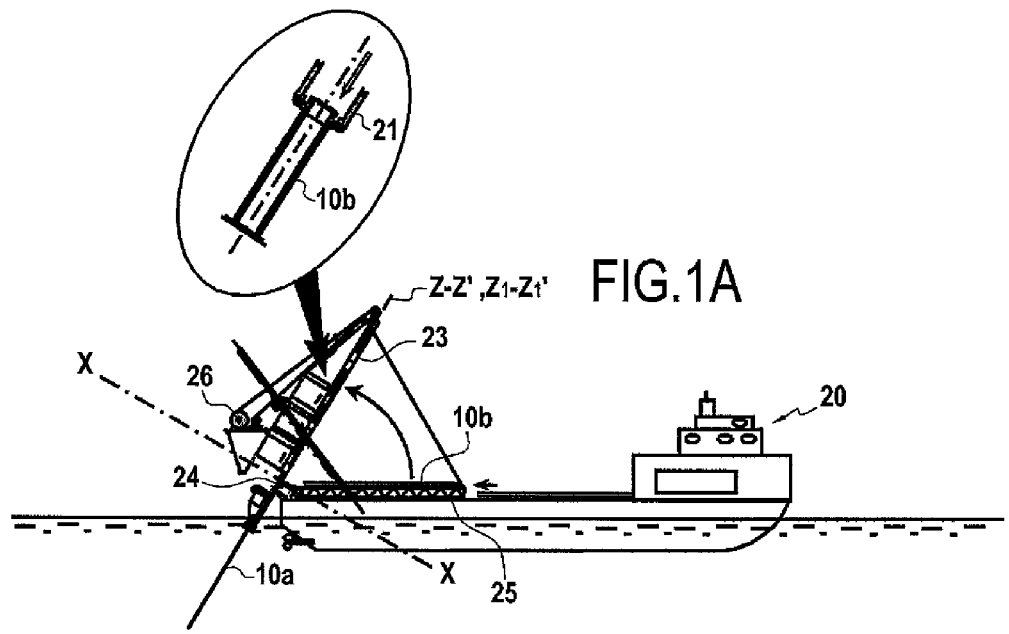
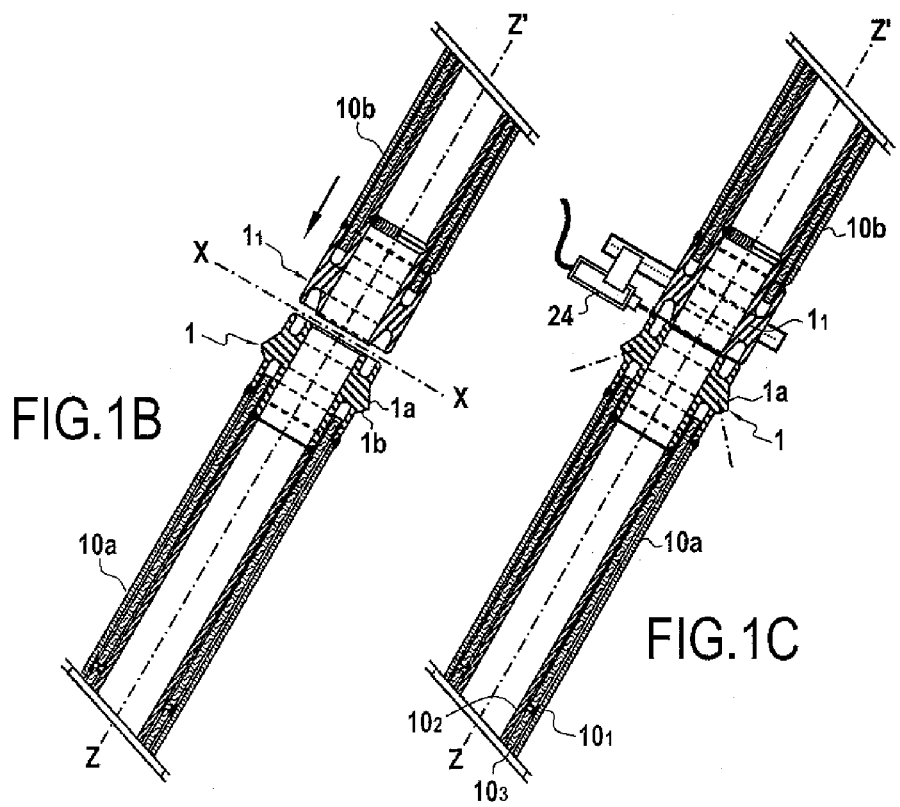

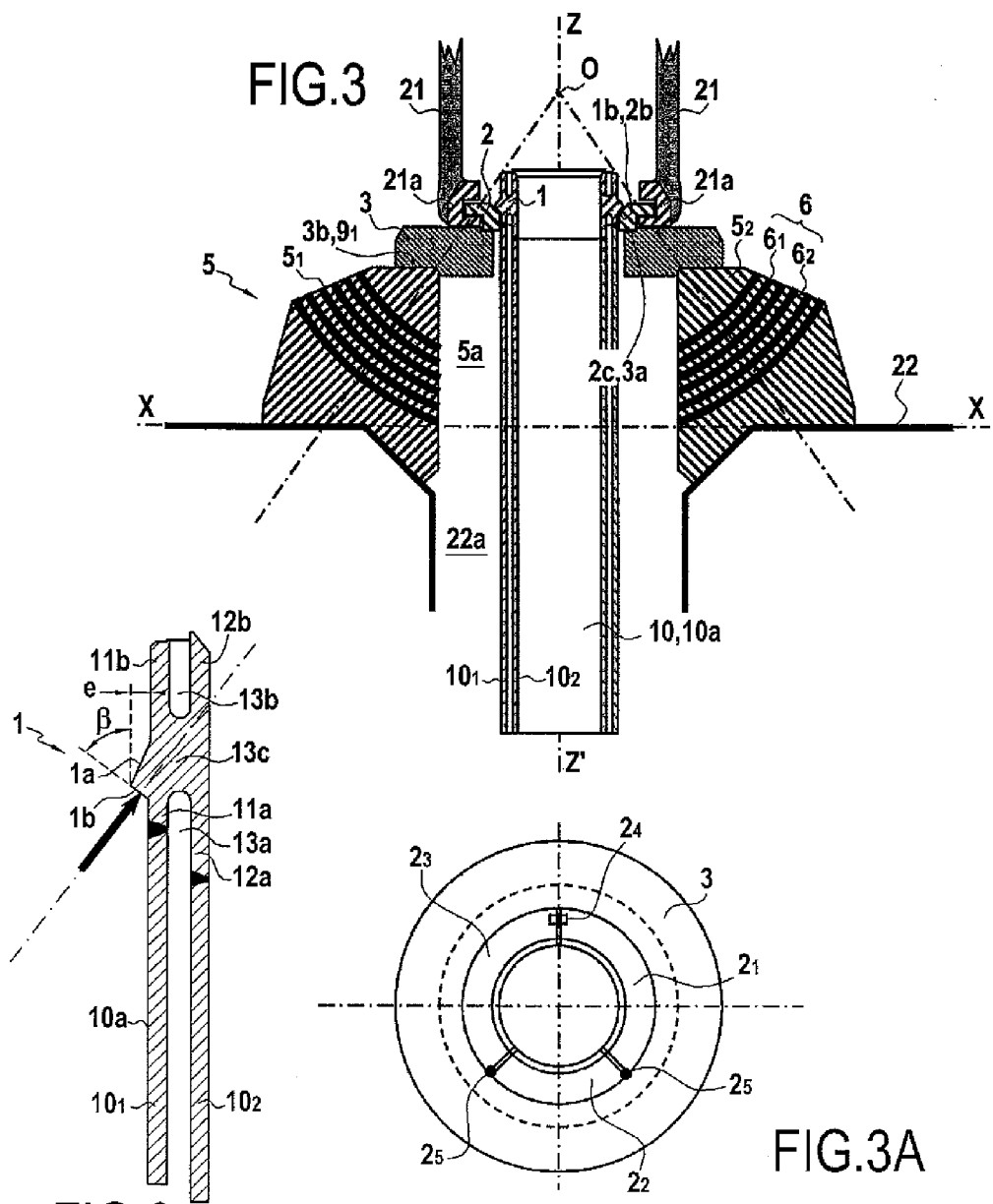

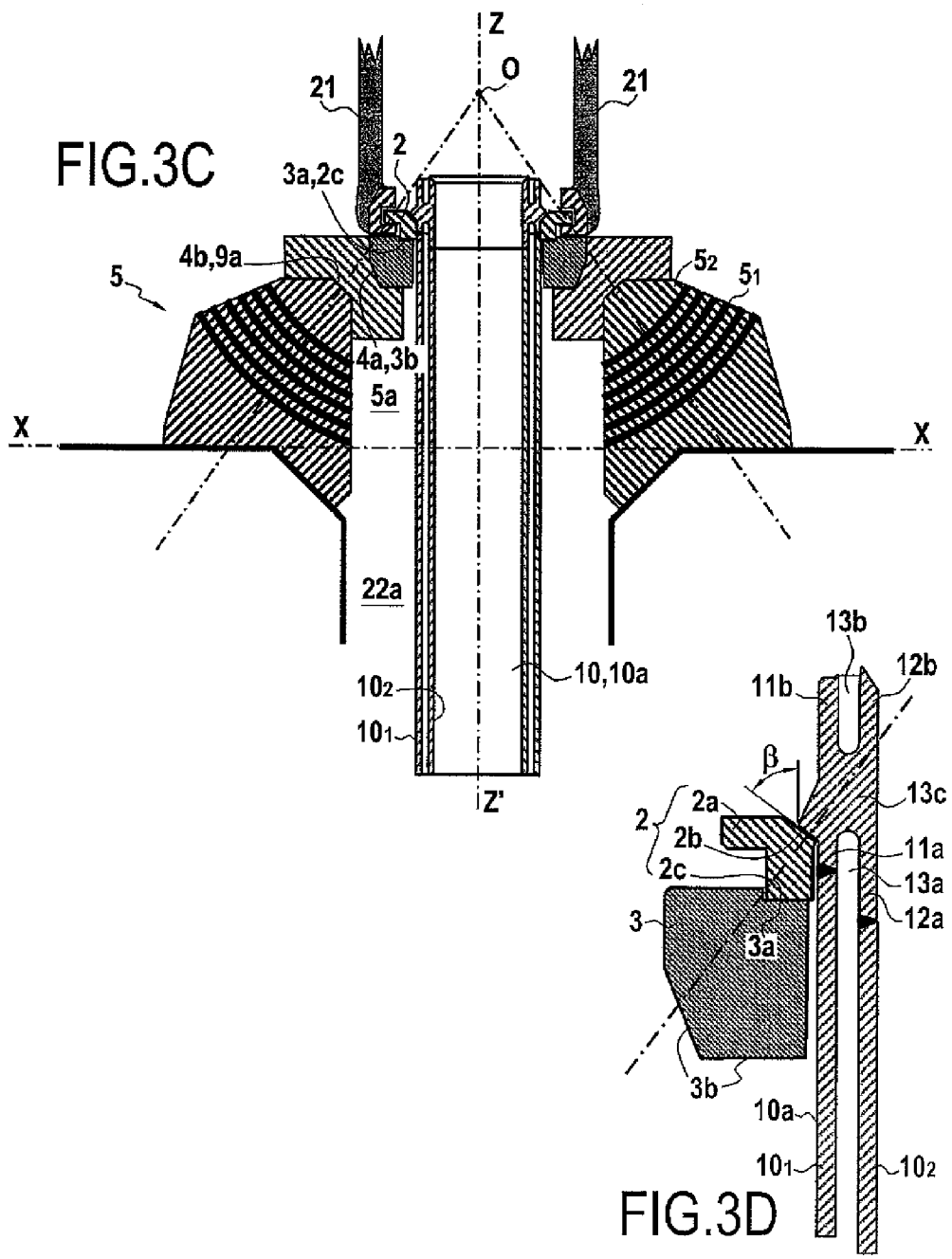

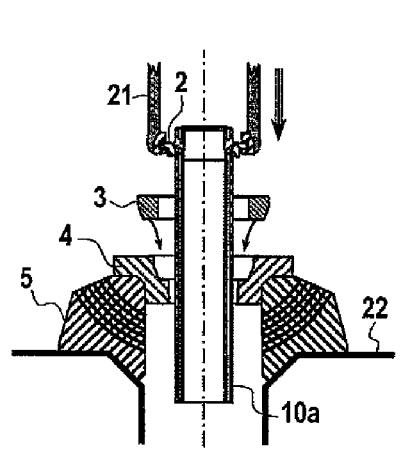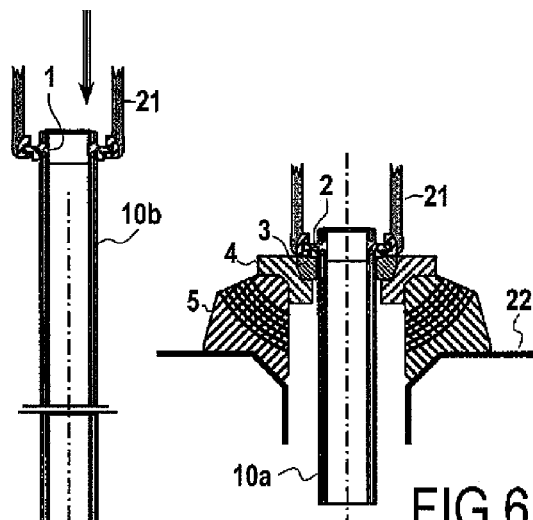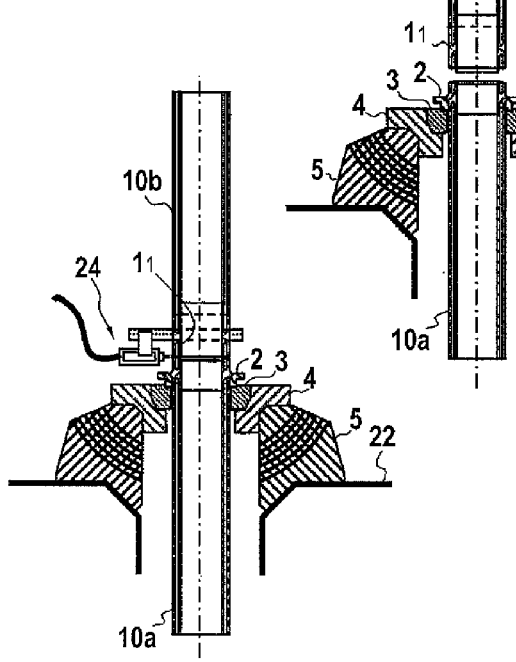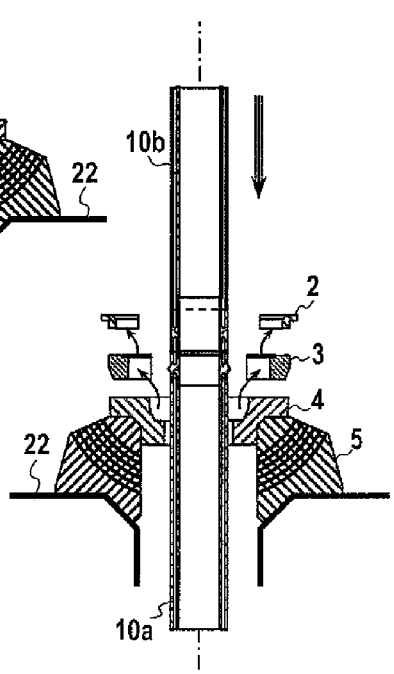

FLOATING SUPPORT COMPRISING A DEVICE FOR THE RETENTION AND SECURING OF A SUBSEA PIPE

PRIORITY CLAIM

This is a U.S. national stage of application No. PCT/FR2008/051805, filed on Oct. 6, 2008. Priority is claimed on the following application: France Application No.: 07 58503 Filed on Oct. 23, 2007, the content of which is incorporated here by reference.

FIELD OF THE INVENTION

The present invention relates to a floating support including a holding and retaining device for retaining and holding an undersea pipe, in particular a pipe having its end retained and held in suspension in an inclined or vertical position from a floating support constituted by a pipe-laying ship, and extending down to the sea bottom, said retaining and holding device enabling successive segments of pipe to be assembled together end to end, preferably by welding on board said floating support or pipe-laying ship.

The term "floating support" is used herein to designate any movable floating assembly, including a ship, suitable for enabling a pipe to be laid.

More particularly, the invention applies specifically to laying an undersea pipe made up of rectilinear segments, also known as "strings", that are assembled to one another by being welded together end to end on board the ship, these strings are generally 24 meters (m) or 48 m long, with the pipe thus being laid by assembling together and progressively lowering successive strings, with each segment or "string" itself possibly being made up of a plurality of unit pipe elements that are themselves assembled together by welding, generally on land, in order to make up a string.

The present invention also relates to a floating support including a retaining and holding device for connecting together and laying successive portions of an undersea pipe from said floating support.

The present invention thus applies to holding a substantially vertical pipe in suspension, and also to any type of pipe that is to convey a fluid, electricity, optical signals, or information, and in particular tubular pipes that are rigid or flexible, umbilicals, and electric cables. The invention applies in particular to undersea pipes that are handled from a ship performing installation operations, in particular in very great depths of water, i.e. in depths of around 1000 m and greater.

The present invention relates more particularly to laying pipes made up of sets of coaxial pipes each comprising an inner pipe and an outer pipe, in particular undersea pipes for conveying hot or cold fluid, preferably undersea pipes for use in very great depths. Such a coaxial pipe (or pipe-in-pipe) (PiP) have an inner pipe conveying the fluid and an outer pipe arranged coaxially around the inner pipe and in contact with the surrounding medium, i.e. water. The annular space between the two pipes may be filled with an insulating material, or it may be evacuated of all gas.

BACKGROUND OF THE INVENTION

In the context of installations in great depths, undersea pipes and sets of undersea coaxial pipes are assembled together on land to constitute elements of unit length, lying in the range 10 m to 100 m, depending on the loading capacity of the laying system. They are then taken to sea in that form on a pipe-laying ship. While being laid, the unit lengths of the various coaxial pipe assembly elements are connected to one another on board the ship and they are progressively laid at sea. It is therefore important for such connections to be capable of being made quickly and easily.

For this purpose, steel junction parts or connection forgings are used that are assembled to the ends of said coaxial pipe assembly elements that are to be assembled together. The junction forging at the downstream end of a first coaxial pipe assembly element that has not yet been assembled is connected to the junction part at the upstream free end of a second coaxial pipe assembly element that has already been assembled at its downstream end.

More particularly, a said junction forging at the end of a coaxial pipe element includes, at each end, two branches forming bodies of revolution, namely an outer branch and an inner branch together forming a fork that defines a said annular space, thereby constituting a first fork having its free cylindrical ends assembled to the cylindrical ends respectively of the outer and inner pipes, and a second fork having its ends assembled to the facing ends of the junction forging of another coaxial pipe element.

Such junction forgings generally seek to improve the strength of pipes that are subjected to high levels of bending during laying, in particular in the zones where two successive unit lengths or successive strings are connected together; and more particularly, in a bottom-to-surface connection, to give them very great resistance to fatigue throughout the lifetime of an installation. Coaxial pipes and junction forgings of this type have already been described, in particular in FR 2 873 427.

Prior assembly of the various pipe portions on board the ship, followed by progressive laying of the pipe on the sea bottom by assembling strings together and then immersing the pipe progressively as the strings are assembled together, is conventionally performed, in particular for laying undersea pipes in depths of more than 1000 m, or indeed more than 2000 m, from a floating support or ship that is fitted with an optionally hinged tower that includes handling means or gripper means, by a so-called J-lay method in which the suspended undersea pipe adopts a curved configuration between its point connected at the surface to the ship and its point in contact with the sea bottom, said shape corresponding to a mathematical curve known as a catenary, i.e. a curve that presents a radius of curvature that increases regularly from the bottom up to the surface.

This kind of laying is referred to as "J-laying" because the shape of the portion of pipe that is in suspension between the ship and the point of contact on the sea bottom is somewhat incorrectly said to be "J-shaped". J-laying is described in numerous patents, in particular the following patents in the name of the Applicant: FR 2 792 991, FR 2 793 540, and FR 2 801 088, amongst others.

Those patents describe a pipe-laying ship fitted with a J-lay tower that serves to perform the following operations:

holding stably the emerging top end of the portion of pipe that has already been assembled and that is immersed in suspension;

lowering the new pipe portion or string, so as to present the bottom end of said new pipe portion or string to said emerging top end of said suspended pipe portion;

firmly holding the ends of the pipe portions that are to be assembled together by welding so that said welding can be performed without risk of damage due to the various movements of the ship and of the immersed pipe portion that is in suspension down to the sea bottom; and finally welding said pipe portions together.

In such J-laying, a difficulty lies in the fact that all of the above-mentioned operations need to be performed at a single location situated on the deck of the ship, i.e. close to the bottom end of the tower, and furthermore all of the operations need to be performed in a minimum amount of time because of the extremely high hourly cost of running the installing ship.

The pipe being assembled is generally held in the bottom portion of the J-lay tower by an external system of clamps.

The use of steel marking-wedge clamps for holding stationary the suspended pipe portion presents the drawback of leaving traces on the outside of the pipe, and above all of damaging its anti-corrosion coating. Numerous other types of clamp have been developed, essentially based on hinged toggle systems or on systems that are locked by cams, with the movements of engaging and disengaging the clamps often being performed by means of hydraulic actuators.

Such clamps are well adapted when loads are small, however in very great depths, i.e. 2500 m, the weight of a pipe may exceed 500 (metric) tonnes (t) and it is necessary to guarantee an extremely high level of safety regardless of the type of pipe during the end-to-end connection stages that may last for 15 minutes to 45 minutes per cycle, or indeed in the event of operations being interrupted for various reasons such as technical incidents or bad weather, which can last for several days. If there is no need to preserve the outer coating of the pipe intact, then marking-wedge clamps as described above perform their function of retaining the pipe perfectly, even if the pipe presents irregularities of diameter, but if said coating is fragile, then it is not possible to use that type of clamp.

Numerous solutions have been developed to avoid damaging the outsides of pipes, however they are not suitable for extreme loads, since they present the drawback of not providing positive safety in the event of sliding phenomena starting, which phenomena run the risk of leading to severe accidents, not only for the equipment, but also for personnel.

In patent FR 2 801 088 in the name of the Applicant, a clamp is described that operates on the friction principle, thereby implying the use of actuators that are disposed substantially perpendicularly to the outside surface of the pipe and that are used for gripping it.

As the laying depth increases, the linear weight of a pipe generally also increases, since pipes need to be capable of withstanding implosion, given that they are laid while empty, i.e. the pressure inside the pipe is substantially atmospheric pressure, whereas the pressure outside the pipe is substantially 1000 bars, i.e. 10 megapascals (MPa) for every 1000 m of depth. Thus, not only does the suspended length increase with depth of water, but the thickness of said pipe also increases, thereby increasing its unit weight. Laying tensions may then be as great as or exceed 1200 t to 1500 t, or even more, and the friction clamps of FR 2 801 088 then present dimensions and complexity that are excessive in order to achieve a very high level of reliability in the operation of laying installations. In addition, the very large dimensions of such devices give rise to considerably increased purchase for currents and swell, thereby requiring greater power for dynamically positioning the ship whose position needs to be maintained very accurately.

U.S. Pat. No. 6,273,643 describes a system for holding and retaining the pipe in a tower, in which the top end of the pipe is rigidly fastened to a platform that is secured to the bottom end of the tower, and the inclination or the curvature of the pipe beneath the rigid fastening of its top end is controlled by a tubular structure device having a larger number of rollers so as to hold the pipe substantially on the axis of the tubular structure.

An installation of that type might generate non-uniform stresses at the pipe-tower junction, which requires safety margins to be provided concerning the mechanical strength of the rigid junction parts, and thus leading to junction parts that are expensive.

The problem posed is thus that of holding an undersea pipe under tension while it is being laid by means of an improved method and device for retaining and holding the pipe, that are simpler and less expensive to implement while nevertheless retaining a maximum level of reliability.

SUMMARY OF THE INVENTION

To achieve this, the present invention provides a floating support including a retaining and holding device for retaining and holding an undersea pipe in suspension from said floating support, the pipe including a first forging in the form of a body of revolution welded to the top end of said pipe and forming an internal tubular pipe section of substantially the same diameter as the diameter of said pipe, the support being characterized in that said retaining and holding device comprises:

a) a said first forging including a first peripheral radial protuberance on its outside surface, said first radial protuberance having on its underside a first contact surface of revolution;

b) at least one first collar releasably locked around and against said first forging via the underface of said first protuberance at said first contact surface of said first protuberance, said first contact surface co-operating by bearing against a second contact surface of revolution of said first collar, said first collar forming a second radial protuberance, preferably a second protuberance in the form of a body of revolution, of diameter that is greater than the diameter of said first protuberance, said second protuberance being suitable for retaining the ends of gripper arms installed on said floating support and serving to raise or lower said pipe in translation relative to said floating support substantially along the axis $Z_1$-$Z_1'$ of said pipe at its top end; and c) support means resting on a stationary platform having a first passage through which the pipe passes, said platform being secured to said floating support, said support means and said platform surrounding said pipe and directly or indirectly supporting said first collar, said first collar presenting a third contact surface of revolution on the underface of said first collar and co-operating by bearing directly or indirectly on said support means, said support means including load transfer and rotary joint means (referred to below for short as "rotary joint means") enabling the axis $Z_1$-$Z_1'$ of said pipe to be guided in inclination at said top end within a virtual cone having an angle at the apex 2a of less than 10°, preferably less than 5° relative to an axis ZZ' perpendicular to said platform, while ensuring that loads are distributed substantially uniformly over all of said contact surfaces when said pipe exerts non-uniform thrust on said contact surfaces and said support means, thereby causing a said inclination of the pipe.

It should be understood that:

said first forging, said first collar, and said contact surfaces share a common axis of revolution corresponding to the axis of said top end of the pipe; and said load transfer and rotary joint means enable the axis $Z_1$-$Z_1'$ of said first forging, of said first collar, and of said first, second, and third contact surfaces to rotate freely within the limit of said cone having an angle at the apex of 2α relative to the axis ZZ' perpendicular to said platform, and ensures that loads and stresses are uniformly distributed over said contact surfaces; and said rotary joint means have an effect of partially recentering the pipe when it becomes inclined relative to the axis ZZ'.

The retaining and holding device of the present invention essentially consists in creating a first protuberance or localized outgrowth at the top portion of the installed pipe portion or string, in particular on the forgings used for assembling together the pipe portions, and at least one said first collar supporting said first protuberance created by the forging, said first collar co-operating by bearing against a said rotary joint so that loads are transferred at the interface between the pipe and the retaining and holding device in substantially isostatic manner over all of said contact surfaces of revolution of said retaining and holding device, regardless of the respective movements of the ship or of said pipe relative to each other. Said rotary joint means enable the compression, shear, and bending stresses to be distributed uniformly over all of said contact surfaces of said device of the invention.

It will be understood that:

said pipe is retained at said platform by said first contact surface of revolution bearing on top of said second contact surface on which it rests and the inside diameter of the passage through the first collar is smaller than the outside diameter of said first protuberance;

said first collar, said support means, and said joint means have a common axis of revolution ZZ' corresponding to said axis of said retaining and holding device, and corresponding to the axis of said first forging when said pipe and said device of the invention are in a rest or minimum stress position; and said first protuberance is made integrally with said first forging and presents, by virtue of its shape, a thickness that is sufficient for the level of compression stress at the interface with said first contact surface to be at a level that is acceptable, it being understood that said stress is distributed substantially uniformly over the periphery of said first contact surface.

However, implementing a said first collar serves to minimize the dimensions of said first protuberance, thus making it possible to avoid excessive variation in the second moment of area of said first forging. The fact that said first protuberance co-operates with said first collar serves, more generally, to avoid making forgings that are of dimensions that are excessive, and thus expensive and difficult to make and to implement. Finally, the fact that said first protuberance is a portion of a forging gives it increased mechanical reliability in terms of optimizing load transfer.

This protuberance enables the load due to the weight of the pipe to be transferred directly to the thick, massive portion of the forging, thereby having the effect of transferring said load to both the outer and the inner pipes, and thus ensuring optimum transfer of stresses within the two suspended coaxial pipes.

The thickness of the protuberance is a function of the load to be supported, which in turn is a function of the length of the pipe and of the outside diameter of the pipe, and thus of the laying depth.

More particularly, for depths going down to beyond 3500 m, said first protuberance presents a thickness of 10 mm to 50 mm, preferably of less than 30 mm, more preferably lying in the range 15 mm to 25 mm, corresponding to a maximum increase in the outside diameter of the protuberance relative to the diameter of the cylindrical surface of the main portion of said first forging lying in the range 20 mm to 100 mm, preferably less than 60 mm, more preferably lying in the range 15 mm to 25 mm.

The term "thickness" is used herein to designate the increase in the maximum radial distance, i.e. the maximum radius of the outside surface of the forging at said protuberance relative to the radius of the cylindrical surface of the main portion of the forging above and below the protuberance, and thus corresponds to half the increase in the maximum outside diameter of the protuberance relative to the diameter of the cylindrical surface of the main portion of said first forging.

Still more particularly, said second protuberance is the result of a peripheral notch formed in the outside surface of said first collar.

Advantageously, said rotary joint device, has a "self-centering effect" on the pipe when the pipe becomes inclined as a result of said floating support moving. It will be understood that the self-centering effect consists in recentering the pipe so as to cause the longitudinal axis of the pipe to coincide with the axis of said cone after a said inclination has occurred.

In an embodiment, said support means comprise a support part forming a body of revolution secured to said floating support and resting on said platform, said support part having a central first through orifice of diameter greater than the diameter of said first protuberance, and said load transfer and rotary joint means enabling the axes of said first forging, said first collar, and said contact surfaces to rotate freely within the limit of said cone having an angle at the apex relative to the axis ZZ' of said support part and of said central first through orifice.

In an embodiment, said load transfer and rotary joint means comprise flexible joint means with a laminated abutment forming a body of revolution having a plurality of elastomer layers interposed between rigid reinforcing layers preferably made of metal, defining surfaces of revolution at rest having the same axis as the axis of revolution ZZ' of said first forging, said support part, and said first collar.

Said surfaces of revolution of the elastomer layers may be frustoconical, annular, plane, or warped in shape, such as a surface having a shape that is of ellipsoidal or parabolic or hyperbolic, or preferably spherical section.

The term "surface of revolution of a shape that is frustoconical or a shape that is of ellipsoidal, parabolic, or hyperbolic section" is used to mean a surface of revolution that is respectively ellipsoidal, parabolic, or hyperbolic and defined between two section planes that are parallel and perpendicular to their axis of revolution.

In particular, given the shape of the elastomer layers of said laminated abutments of frustoconical or spherical shape, in particular when the laminated abutments are of spherical section and referred to as spherical laminated abutments, the stresses and thus the deformations generated at said laminated abutments and at said forging are minimized, thereby making it possible to maintain or reestablish a substantially coaxial position for said device of the invention and said pipe.

In a second embodiment, said load transfer and rotary joint means and said support means are constituted by a plurality of hydraulic actuators, preferably at least three hydraulic actuators, regularly distributed around said first passage of said platform and around said pipe, the actuator cylinders resting on said platform around said first passage through which the pipe passes, and the rods or pistons of said actuators preferably having small ball-joints free to rotate at their ends, said ends of the actuator rods directly or indirectly supporting said third contact surface of said first collar, said actuator cylinders being interconnected so that fluid can be exchanged between them in order to establish differential movements in translation of said rods of the various actuators when non-uniform thrust is exerted on said ends of the actuator rods.

In a third embodiment, said support part forming a body of revolution and said load transfer and rotary joint means comprise a type of mechanical ball-joint constituted by two rigid parts, namely a bottom part forming a body of revolution resting on said platform, and a top part forming a body of revolution, said first collar bearing directly or indirectly on said top part, said bottom part presenting a concave top contact surface of spherical section slidably co-operating with a complementary convex surface of spherical section constituting the bottom surface of said top part of said support part, at least one of said concave and convex surfaces having an anti-friction coating, preferably a polymer coating.

It should be understood that the axis of revolution of said top part in the form of a body of revolution corresponds to the axis of said first forging, said first collar, and said first and second contact surfaces, and the axis of said bottom part in the form of a body of revolution resting on said platform corresponds to the axis of said cone having an angle at the apex of $2\alpha$.

It should be understood that:

said spherical concave and convex surfaces are centered at a common point above the top end of the pipe or the retaining and holding device of the invention on the same axis of revolution as the top end of the pipe and of said device and allows for relative sliding between said complementary surfaces thus co-operating in rotation relative to each other by sliding so that the inclination of said pipe remains within a cone having an angle at the apex of less than 10°, preferably less than 5°; and said third contact surface of said first collar comes to bear directly or indirectly on said top part.

It should be understood that said above-described rotary joint means enable load transfers to be distributed substantially isostatically over the entire peripheries of said contact surfaces when a load unbalance arises as a result of an inclination of the pipe.

Nevertheless, for reasons of ease of fabrication and/or positioning on the floating support, it is preferred to use flexible joint means of the type comprising an elastic laminated abutment, or preferably rotary joint means of the hydraulic type using actuators as described above.

It is preferable to use hydraulic type joint means since, in such an embodiment, there is no need to implement a said support part on the floating support independently of said rotary joint means, and said support means including hydraulic actuators are thus easy to put into place and, where appropriate, to remove from the floating support.

It should be understood that the rods of the actuators are disposed substantially parallel to said axis of revolution of the device of the invention and perpendicularly to said platform, and that the rods of the actuators may be relatively short in length, in particular of a length that is less than 10 centimeters (cm), preferably less than 5 cm, given the small angular movements that are allowed.

In a preferred embodiment, said first and second contact surfaces are frustoconical surfaces of revolution inclined relative to the axis $Z_1$-$Z_1'$ of said first forging, preferably by an angle $\beta$ lying in the range 30° to 60°, more preferably of about 45°.

It should be understood that said first and second frustoconical contact surfaces are inscribed within a cone having an angle at the apex situated at the bottom end of said cone, i.e. below said first and second contact surfaces.

Also preferably, said third contact surface of said first collar is a frustoconical surface of revolution, preferably having the same angle of inclination as said first and second frustoconical contact surfaces.

In another preferred embodiment, said first collar co-operates indirectly with said support means via a second collar that is releasably locked around the outside surface of a portion of said first collar including said third contact surface, said second collar including a second contact surface of revolution on which said third contact surface of said first collar bears, said second collar preferably presenting a maximum outside diameter and a through inside diameter that are larger than the maximum outside diameter and the through inside diameter respectively of said first collar, said second collar presenting in its bottom portion a fifth contact surface of revolution co-operating directly or indirectly by bearing against a sixth contact surface of revolution at the top portion of said support means.

More particularly, the diameter of the first through orifice through which the pipe passes through said support part corresponds substantially to the diameter of the second through orifice on said platform and is preferably greater than the inside diameter of said second collar.

Preferably, the inside through diameter of said second collar is greater than the outside diameter of said first protuberance, such that, where appropriate, said pipe may be lowered after connection merely by withdrawing said first collar, without unlocking and withdrawing said second collar bearing on said support part.

It should be understood that said contact surfaces of revolution are surfaces extending over the entire peripheries of the outside surfaces of the parts or collars concerned.

Also advantageously, the device of the invention includes a third collar locked around at least a bottom portion of a said second collar, said third collar including a top seventh contact surface of revolution on which said fifth contact surface of revolution of said second collar comes to bear, and a bottom eighth contact surface of revolution bearing directly against said sixth contact surface at the top portion of said support means, said third collar preferably presenting a maximum outside diameter and a through inside diameter that are greater than the maximum outside diameter and the through inside diameter respectively of said second collar.

It should be understood that:

said second and third collars and said fourth to eighth contact surfaces share the same axis of revolution corresponding to the axis of said top end of the pipe; and said load transfer and rotary joint means enable the axis of said first forging, of said first collar, and of said first, second, and third contact surfaces to be hinged to rotate freely within the limit of said cone having an angle at the apex of $2\alpha$ relative to the axis ZZ' perpendicular to said platform.

Implementing the various collars of increasing diameter involves implementing said first, second, third, fourth, fifth, seventh, eighth, and sixth contact surfaces referred to as contact surfaces of revolution, which surfaces are of increasing areas, thereby making it possible to limit the number of occasions on which collars need to be dismounted as a function of the required through diameter. These dismountable elements need to support loads that are considerable, several thousand tonnes, which means that these elements are extremely massive and difficult to handle. The greater the through diameter relative to the outside diameter of the pipe, the greater the bending forces within said dismountable collars, thereby requiring considerable amounts of reinforcement. By using multiple collars in this way, if only the pipe needs to be passed, then the first collar has a through diameter that is slightly greater than the diameter of the protuberance, which requires first collars of reasonable size that can be removed and put back on each cycle of assembling an additional string. If it is necessary to install insulation protection around the pipe, in the assembly zone, then the required through diameter is greater and it will then be necessary to dismount and remount the first and second collars on each assembly cycle. Finally, if it is required to pass bulky parts, such as automatic connectors or traction heads, all of the collars are dismounted so as to provide a full passage. Although the last collar is extremely massive and heavy, it needs to be dismounted only on exceptional occasions.

Preferably, all of said contact surfaces include at least a portion having the same frustoconical shape, i.e. lying on a cone having the same half-angle at the apex, preferably in the range 30° to 60°, still more preferably about 45°.

Also advantageously, said first, second, and where appropriate third collars are made up of a plurality of portions forming angular circular-collar sections, said angular collar sections or portions being releasably locked together, or preferably only two adjacent portions being locked together with the other portions being hinged to one another at each end so as to enable said collar to be opened after it has been releasably unlocked.

This embodiment makes it easier to put collars into place and to withdraw them.

The retaining and holding device of the invention is particularly advantageous when said pipe is a set of PiP type coaxial pipes and said first forging is a junction part at the end of a first portion of the coaxial pipe assembly for assembling, said junction parts having outer and inner branches forming bodies of revolution that define two annular cavities, with the outer and inner first branches being welded respectively to said outer and inner pipes of said first portion of said set of two coaxial pipes, said first protuberance being formed on the outside surface of a full-thickness zone between the two annular cavities, and said first inner branch preferably being longer than said first outer branch.

This characteristic makes it easier to perform welding with external welding beads at the ends of said inner and outer pipes.

The present invention also provides a floating support including a device for connecting together and laying successive portions of an undersea pipe from said floating support, preferably with the help of a J-lay tower, the floating support being characterized in that said platform on which said support means rests is situated in a bottom portion of said tower perpendicularly to the axis of said tower, and said load transfer and rotary joint means allow a said inclination to take place within a said cone of axis corresponding to the axis of said tower.

It should be understood that:
said second pipe portion is disposed above said first pipe portion; and
the retaining and holding device of the present invention is open or released to allow said undersea pipe to be fully immersed after said first and second pipe portions have been assembled together, preferably by welding.

The present invention also provides a method of retaining and holding a pipe on a support of the invention, the method being characterized in that the following steps are performed:
a) welding a said forging including a said first protuberance to the top end of said pipe; and
b) locking a said first collar so that it bears against said first contact surface of said first protuberance; and
c) where appropriate, putting into place said third and second collars locked and bearing against a said support means, secured to a said platform at the bottom portion of said J-lay tower; and
d) lowering a first pipe portion including a said first forging with a said first protuberance at the top end of said first pipe portion using said gripper arms until it comes into abutment on said support means or, where appropriate, on said second or third collars, said first collar being locked against said first protuberance, said gripper arms retaining said first collar preferably via the underface of a said second protuberance.

Finally, the present invention provides a method of connecting together two pipe portions and laying the pipe as connected together in this way at sea from a floating support including a J-lay tower of the invention, the method being characterized in that the following steps are performed:
1) where appropriate, putting said third and second collars into place locked and bearing against a said support part secured to a said platform at the bottom portion of said J-lay tower;
2) lowering a first pipe portion including a said first forging with a said first protuberance at the top end of said first pipe portion by using said gripper arms so that it comes to bear against said support means, or where appropriate against said second or third collar, a said first collar being locked against said first protuberance, said gripper arms retaining said first collar preferably via the underface of a said second protuberance, where appropriate; and
3) lowering a second pipe portion including a said first forging with a said first protuberance at its top end by using said gripper arms co-operating with said first collar locked around said first forging, until the bottom end of said second pipe portion, preferably including a second forging with or without a said first protuberance, is positioned in abutment with the top end of said first forging at the top end of said first pipe portion; and
4) connecting said first and second forgings together, preferably by welding; and
5) lifting the connected-together pipe a little using said gripper arms and unlocking and removing at least said first collar; and
6) lowering the connected-together pipe into the sea through the orifices of said first and second through orifices of said support means and of said platform.

BRIEF DESCRIPTION OF THE DRAWINGS

Other aspects, characteristics, and advantages of the present invention appear better in the light of the following detailed description made by way of non-limiting illustration with reference to the drawings, in which:

FIG. 1A shows a string-laying ship fitted with a J-lay tower;

FIG. 1B is a side view of a pipe going down to the sea bottom and held in tension within said J-lay tower by the device of the invention (not shown), with a string held in the top portion of said J-lay tower, said string being moved towards said suspended pipe for the purpose of being assembled thereto by welding;

FIG. 1C is a side view showing two pipe portions while they are being welded together;

FIG. 2 shows a detail of said first forging with its said first protuberance;

FIG. 3 is a side view of a variant retaining and holding device of the invention including laminated abutments and first and second collars;

FIG. 3A is a view from below of the FIG. 3 device;

FIG. 3B shows the first collar when open and unlocked;

FIG. 3C is a side view of a first variant of the retaining and holding device of the invention including laminated abutments and first, second, and third collars;

FIG. 3D is a side view in section showing details of said first forging with its said first protuberance co-operating with said first and second collars;

FIGS. 6A to 6E are side views of a sequence of assembling a new string to the pipe that has already been laid and that is held within the J-lay tower by means of the device of the invention.

DETAILED DESCRIPTION OF THE PRESENTLY PREFERRED EMBODIMENTS

Figure 4A:
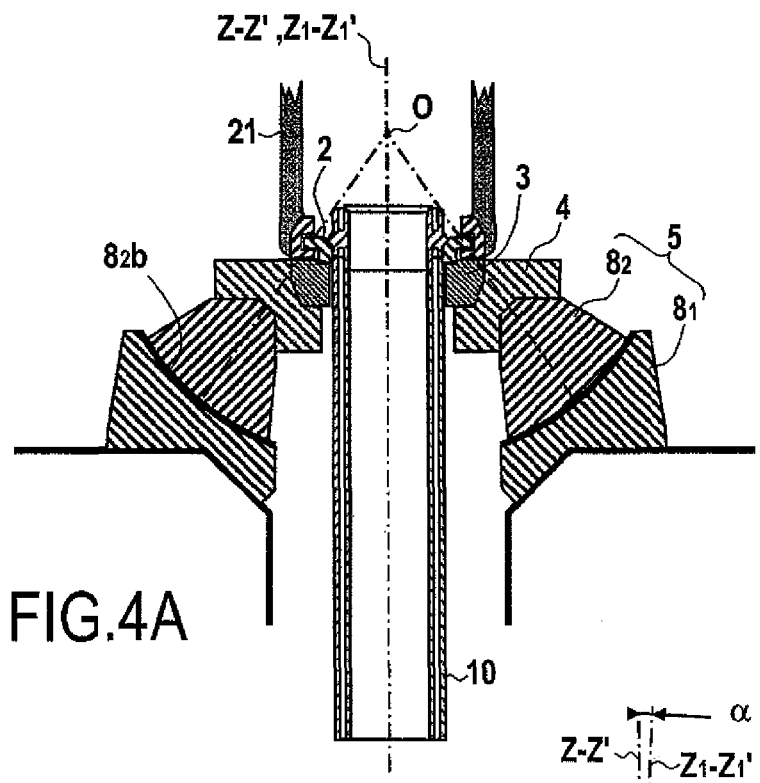
FIGS. 4A and 4B are side views of a variant device of the invention including a spherical mechanical ball-joint, said device being shown respectively on its axis and inclined by an angle α relative thereto.

FIG. 1A is a side view of a pipe-laying ship 20 fitted with a J-lay tower 23 of inclination that is variable about its axis of rotation at the bottom portion 24 of the tower. The ship 20 enables a pipe to be laid that is made up of pipe segment strings that are assembled together and laid little by little, each string itself being made up of a plurality of unit pipe elements that are welded together, in general on land, with the welding between the strings being performed on the pipe-laying ship, as explained below.

Level with the welding station in its bottom portion 24, the J-lay tower includes a retaining and holding device of the invention, with several variants thereof being shown in FIGS. 3, 3C, 4A, and 5.

FIG. 1A shows a portion 10a of undersea pipe for providing a connection between the pipe-laying ship and the sea bottom, with the emerging top end thereof being held firmly at the base of the J-lay tower with the help of a retaining and holding device of the invention.

An additional string 10b for assembling to the top end of the suspended undersea pipe portion 10a for subsequent laying is initially at rest on the deck of the ship. The string 10b comprises two to four unit pipe elements that are assembled together by welding, with the string having a length lying in the range 24 m to 48 m. A lifting beam 25 is suitable for supporting and raising said string from its substantially horizontal position to the level of inclination of the tower into which it is to be transferred. At the top of the tower, the top end string 10b fitted with a said first junction part 1a as described below, is held by a gripper device 22 allowing the string to be moved in translation along the longitudinal axial direction ZZ' of the tower until another or second junction forging $1_1$ at the other end of the string 10b comes level with a said first junction forging 1, the immersed top end 10a of the pipe portion being held in suspension on a catenary-shaped curve down to its point of contact with the sea bottom.

As shown in FIGS. 1B and 1C, said second junction forging $1_1$ at the bottom end of the string 10b is welded to said first junction forging 1 at the top end of the pipe portion 10a in the assembly plane XX level with a welding station 24 in the bottom portion of the J-lay tower. With the tension from the top end of the pipe being taken up by means of a winch 26 connected to the gripper 22, the retaining and holding device of the invention may be released to release the pipe whose top end corresponds to the top end of the string 10b, which may then be lowered in turn down to the assembly plane in order to have an additional string assembled thereto, if any, with the retaining and holding device of the invention then being reactivated in order to support the pipe and perform the following connection step.

FIGS. 1B and 1C show a string 10b and a pipe portion 10a of a pipe-in-pipe (PiP) type pipe that is constituted by an inner pipe $10_2$ and an outer pipe $10_1$ that are secured to a said first junction forging 1, said pipe 10a and said second junction forging $1_1$ at the bottom end of the string, the annular space between said inner and outer pipes being filled with an insulating material $10_3$.

In conventional manner and as described in FR 2 873 427, and as shown in FIGS. 1B, 1C, and 2, said first and second junction forgings 1 and $1_1$ are defined as follows:

in a direction that is radial relative to a longitudinal axis ZZ' of revolution of said forging, each of said forgings is defined by a cylindrical inner wall of substantially the same diameter as the main portion of said inside pipe $10_2$, and by a cylindrical outer wall of diameter substantially equal to the outside diameter of the main portion of said outer pipe $10_1$; and in the longitudinal axial direction ZZ':

at the end of said junction forging that is assembled to the ends of said outer and inner pipes of a said element of an assembly of at least two coaxial pipes, said outer and inner walls of said junction forging forms, in longitudinal section, respective first outer and inner branches 11a and 12a of substantially the same thickness as said outer and inner pipes 3 and 2 to which they are to be assembled, said first outer and inner branches 11a, 12a defining a first annular cavity 13a; and at the opposite end of said junction forging that is assembled to said other junction forging, itself assembled to the end of another element of a set of two coaxial pipes, said outer and inner walls form, in longitudinal section, respective second outer and inner branches 11b and 12b that define a second annular cavity 13b; and the bottoms of said first and second cavities 13a and 13b being spaced apart in said longitudinal direction ZZ' so as to define a solid zone 13c of said junction forging in which said outer and inner walls form the outside and inside faces of a common cylindrical wall.

As shown in FIG. 2, level with its solid zone 13c, said first forging 1 includes a first protuberance 1a of thickness e lying in the range 10 mm to 50 mm, and preferably in the range 5 mm to 25 mm, corresponding to an increase in the diameter of the surface of said forging relative to its cylindrical main portion of about 20 mm to 100 mm, and preferably lying in the range 30 mm to 50 mm.

FIG. 3 is a side view in section of a retaining and holding device of the invention for retaining and holding a suspended pipe, the retaining and holding device including flexible hinge means of the spherical laminated abutment ball-joint type, for the purpose of allowing the axis $Z_1$-$Z_1'$ of the top end of the pipe free to pivot relative to the axis ZZ' of the tower, by means of the elasticity of the elastomer layers $6_1$ of said spherical laminated abutment ball-joint.

More precisely, in this first variant embodiment of a retaining and holding device of the invention, a support part 5 or base shoe in the form of a body of revolution with a central orifice constituting a first passage 5a corresponds substantially to the diameter of the through orifice, referred to as the second passage 22a, in a platform 22 on which said support part 5 rests. Said platform 22 is disposed perpendicularly relative to the axis ZZ' of the tower. Said first and second passages 5a and 22a are designed to pass the pipe 10 that is held in suspension by the retaining and holding device of the invention. The support part 5 incorporates flexible rotary joint means $5_1$ constituted by a laminated abutment 6 comprising a stack of elastomer layers $6_1$ separated by rigid sheets $6_2$ that are preferably made of steel, their shape preferably being spherical on a center O that lies on the axis ZZ' of the tower when said flexible joint means are at rest. The laminated abutment 6 is surmounted by a top portion $5_2$ of said support part, having a top outside face including a said sixth contact surface of revolution 9a in the form of a plane annulus, or bearing surface, on which there rests a said fifth contact surface of revolution 3b that is also in the form of a plane annulus on the underface of a second collar 3. The top surface of the second collar 3 provides a bearing surface to a first collar 2. The second collar 3 is releasably locked about the outside surface of a bottom portion of said first collar 2, including a third contact surface 2c under said first collar 2 and coming to bear against said fourth plane annular contact surface of revolution 3a of the top outside surface of said second collar.

At its top end, the pipe 10 includes a first junction forging 1, as described above, including on its outside surface a first peripheral protuberance 1a presenting on its underface a first contact surface of revolution 1b that is of frustoconical shape, corresponding to an inclination relative to the axis $Z_1$-$Z_1'$ of the forging at an angle β lying in the range 30° to 60° and preferably being about 45°, said frustoconical surface flaring upwards, i.e. with the vertical apex of the cone being situated beneath said frustoconical surface. Said first collar 2 is releasably locked around and against said first radial protuberance 1a of said first circularly symmetrical forging. More precisely, said first collar 2 has on its surface directed towards its central orifice a second contact surface 2b of revolution having the same frustoconical shape as said first contact surface 1b against which it comes to bear. Said second collar 2 has a second protuberance 2a forming a notch relative to the top surface of the second collar 3 on which said first collar 2 rests, which notch is suitable for receiving the ends 21a of a gripper arm 21 under said first collar 2 so as to retain said top end of the pipe until it is lowered along the axis ZZ' and comes to bear against said second collar 3.

The spherical laminated abutment 6 allows rotation by bending of its top portion $5_2$ and thus of the pipe 10 when it is resting, bearing against and suspended from said first and second collars 2 and 3 on the top portion $5_2$ of said support part 5, said rotations corresponding to angles of inclination of the pipe in a virtual cone having an angle at the apex 2α that is less than 10°, preferably less than 5° relative to the axis ZZ' of the tower.

FIGS. 3A and 3B show various portions $2_1$, $2_2$, and $2_3$ of said second collar 2, these portions constituting angular sections of the circular collar, including a middle portion $2_2$ connected via hinges $2_5$ to end portions $2_1$ and $2_3$, said end portions $2_1$ and $2_3$ being connected to each other by locking means $2_4$.

These hinge means $2_5$ and locking means $2_4$ enable the collar to be laid and locked in a loop or opened so as to be removed, where appropriate, as explained below.

FIGS. 3A and 3B show in detail the embodiment of a first collar 2, however the second collar 3 and the other collars described below are made likewise on the same principles as a plurality of portions that are angularly hinged together.

Said first and second collars with circular central orifices may also be referred to as "circular clamps" given that the various collars are locked to one another.

FIGS. 3C and 3D show a second variant embodiment of a retaining and holding device of the invention with a support part 5 including a laminated abutment. In this second variant embodiment, a third collar 4 is used. This third collar 4 is locked around a bottom portion of an intermediate said second collar 2. The intermediate second collar 2 includes said fourth contact surfaces of revolution 3a on which said third contact surface 2c under first collar comes to bear, and said collar presents in its bottom portion a said fifth contact surface of revolution 3b that, in this embodiment, no longer co-operates directly with said sixth surface of revolution 9a in the top portion of the support part 5, but co-operates with a top, seventh contact surface of revolution 4a on which said fifth contact surface 3b of said second collar comes to bear. Said third collar includes in its underface an eighth contact surface of revolution 4b bearing directly against said sixth contact surface of revolution 9a in the top portion of the support part 5.

In FIG. 3C, said fifth contact surface 3b in the underface of the second collar 2, said seventh contact surface 4a in the top portion of the third collar 3, said eighth contact surface 4b in the underface of said third collar 3, and said sixth contact surface 9a in the top portion of the rigid support part 5 have respective middle portions of frustoconical shape at non-identical angles of inclination. Said fifth contact surface 3b in the underface of the second collar and said seventh contact surface 4b of the third collar 4 present plane annular portions beside the pipe and vertical cylindrical outer portions on the opposite outer side. Conversely, said fifth surface of revolution 3b in the underface of the second collar 3 and said sixth contact surface 9a in the top portion of the rigid part 5 present a portion $9_1$ of vertical cylindrical shape beside the inner pipe and a portion $9_2$ of plane annular shape on the outer opposite side.

Said first collar 2 presents an inside diameter that is slightly greater than the outside diameter of the main portion of said first forging 1 on the underside of said first protuberance 1a. Said third collar 4 on the under side of said second collar 3 presents an inside diameter greater than the inside diameter of said second collar 3, itself greater than the inside diameter of the first collar 2. Conversely, the outside diameter of said second collar 2 is less than the outside diameter of said third collar. This stack of said first, second, and third collars presents the advantage of requiring disassembly and reassembly only of those collars that correspond to the required through diameter for passing each string. For passing very large parts, such as automatic connectors or pipe line terminations, the last collar, a part presenting very high bending strength, i.e. a part that is very bulky and very heavy, needs to be dismounted and remounted, but that happens only occasionally, whereas the first collar, which is more compact and lighter in weight, can be dismounted and remounted without difficulty on each cycle of installing a new string.

Figure 4B:
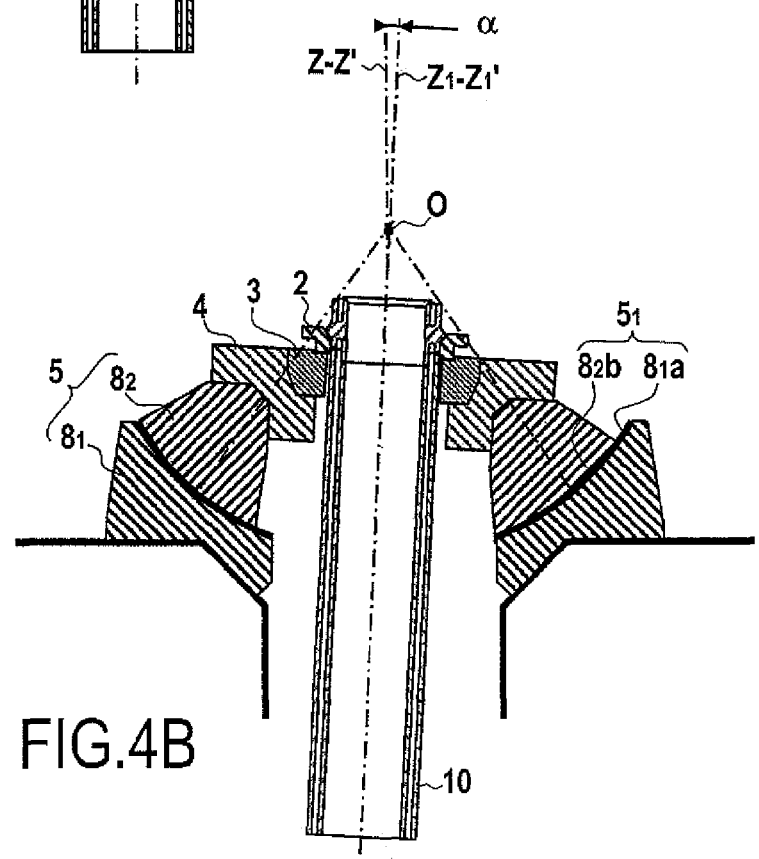

FIGS. 4A and 4B show a second variant embodiment of a retaining and holding device of the present invention of the mechanical ball-joint type.

This third variant differs from the preceding variants in the structure of the support part 5, which is made of:

a bottom or base piece $8_1$ resting on said platform and presenting a spherical concave top surface $8_1a$ that is coated in a layer of anti-friction polymer, preferably Teflon; and a top part $8_2$ constituting the top portion of the support part 5, presenting a bottom surface $8_2b$ of spherical convex shape complementary to the spherical concave shape of the top surface $8_1a$ of the bottom part $8_1$, the concave and convex spherical surfaces having the same center of and being suitable for co-operating in rotation by virtue of said top portion $8_2$ sliding on said bottom portion $8_1$. In the event of rotation, the inclinations of the axis of revolution of the pipe 10 and of the bottom convex spherical surface of revolution $8_2$ are substantially identical, through an angle α relative to the axis of revolution of the spherical concave bottom surface $8_1$ or the axis of revolution of said second through orifice 22a, or indeed the longitudinal axis of the pipe 10 when the pipe is bearing at rest against said platform 22.

The term "surface of spherical shape centered at O" is used herein to designate a surface inscribed within a spherical envelope of a common sphere of center O placed above said surfaces. It will be understood that in practice said concave and convex spherical surfaces have the concave surface facing upwards and the convex surface facing downwards.

The laminated abutment rotary joint or mechanical ball-joint as described above of a retaining and holding device of the invention serves to transfer to the carrier structure constituted by the platform 22 at the base of the J-lay tower 23 all of the forces that result from the pipe being at an angular offset of angle α as shown in FIG. 4B, and without thereby creating bending stress in the plane XY perpendicular to the axis ZZ' of the tower at said first frustoconical contact surface of revolution, thereby constituting an isostatic bearing support in the event of the angle of the pipe varying.

Figure 5:
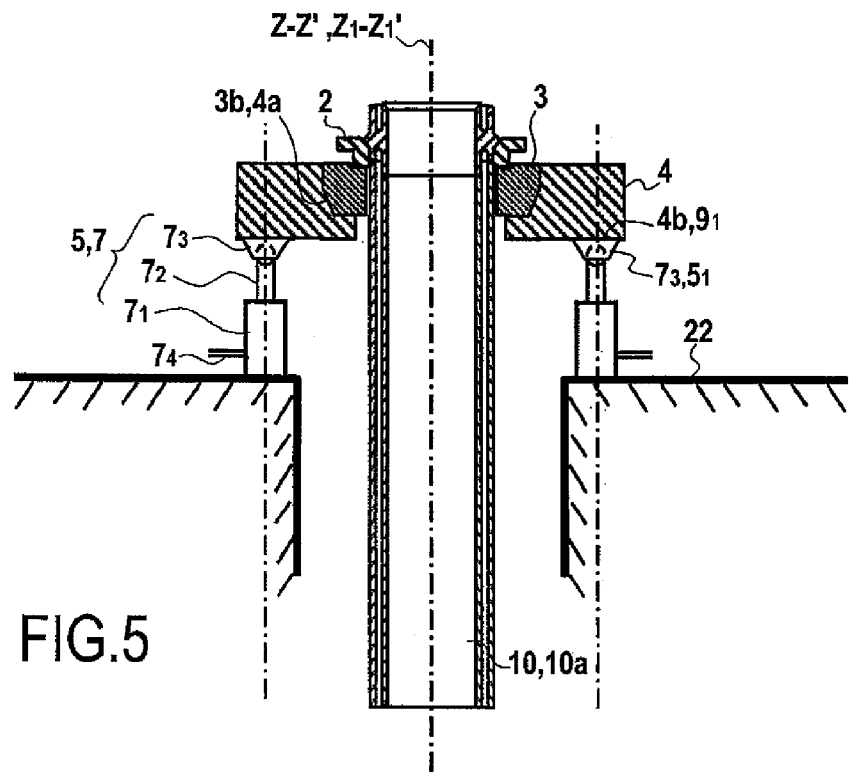
FIG. 5 is a side view of a variant device of the invention including coupled-together hydraulic actuators.
Figure 5A:
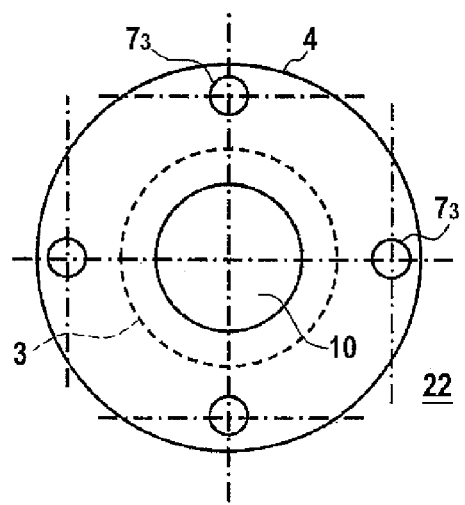
FIG. 5A is a view of the FIG. 5 device seen from below.

FIGS. 5 and 5A show a third variant embodiment of a retaining and holding device of the invention that differs from the preceding devices in that the support means 5 include rotary joint means $5_1$ of hydraulic type.

More particularly, the support means 5 are constituted by a plurality of hydraulic actuators, specifically as shown in FIG. 5A, by four hydraulic actuators 7 that are distributed at 90° intervals around said second through orifice 22a of the platform 22 through which the pipe 10 passes. More particularly, the actuator cylinders $7_1$ rest on said platform 22 around said second through orifice 22a, and the rods or pistons $7_2$ of said actuators are disposed substantially parallel to the axis ZZ' of the retaining and holding tower of the invention for retaining and holding said pipe at rest and have ends that support said eighth bottom contact surfaces of revolution 4b on the underside of said third collar 4. Under such circumstances, the top ends of said small ball-joints $7_3$ constitute said sixth contact surface $9_1$ at the top portion of the support means 5.

Said actuators preferably present identical piston sections and they are disposed at a constant distance from the axis ZZ' so that the moment of the force exerted by each of the actuators relative to the axis ZZ' is constant. In the same manner, it is possible for one of the actuators to be located further away from the axis ZZ', but for it to have a piston section that is reduced in proportion so as to conserve the same moment for the force it exerts relative to the axis ZZ'. It is then appropriate to increase the stroke of said actuator in proportion and thus the length of its rods, so as to ensure it enables the assembly to rotate within said cone of angle α.

The various actuator cylinders $7_1$ are connected together at $7_4$ so that oil may be exchanged as soon as any load unbalance appears between them. Thus, as soon as the pipe becomes inclined by an angle α, as described with reference to FIG. 4B, the right actuator shortens and expels oil towards the other actuators, such that the load remains uniformly distributed on the periphery of the bearing surface constituting said first contact surface 1b on the underside of the first protuberance, regardless of variations in the angle α. Thus, the actuators are not connected to any hydraulic power supply unit but are in communication with one another via pipes serving to allow oil to be transferred freely and enabling the retaining and holding device of the invention to perform an isostatic bearing function.

The actuator cylinders are initially filled with hydraulic fluid in such a manner that when the axis $Z_1$-$Z_1'$ of the pipe coincides with the axis ZZ', all of the actuator rods are at half-stroke. The rods of each of the actuators are of a length such that for a maximum positive variation in the angle α (to the right), the right actuator comes into bottom abutment and the left actuator comes into top abutment. Similarly, for a maximum negative variation in the angle α (to the left), the right actuator comes into top abutment and the left actuator comes into bottom abutment. The length of the actuator rods is advantageously limited so as to limit rotation of the pipe to within a cone having an angle at the apex 2α that is less than 10°, and preferably that is less than 5°.

In the different variant embodiments of the rotary joint means $5_1$, said means always present a pipe self-centering effect.

In FIGS. 6A to 6E, there can be seen side views in section of the various steps involved in putting a retaining and holding device of the invention into place. In FIG. 6A, a first pipe portion 10a is lowered by means of gripper arms 21 from the top of the J-lay tower 23. To do this, said first forging 1 at the top end of the first pipe portion 10a co-operates with a said first collar 2 via said first protuberance 1a so that the ends 21a of said gripper arms 21 are hooked against and retain said second protuberance 2a of said second collar 2, thus enabling the pipe portion 10a to be lowered. It will be understood that said first collar 2 is locked to itself so that said first contact surface 1b under said first protuberance comes to bear against said first collar at a said second contact surface 2b at the top of said first collar. Said pipe portion 10a may be lowered until said third contact surface of revolution 2c on the underside of said first collar comes to bear against said fourth contact surface of revolution 3a on the top of said second collar 3. Previously, said second collar or intermediate collar has been locked to itself and lowered, bearing against the top inside surface of the third collar 4, itself resting on the top portion of a circular support part 5 resting on the platform 22 as described above. Once the first pipe portion 10a is resting on the support part 5 via said first, second, and third collars, as shown in FIG. 6B, the gripper arms are released and a new string or a new pipe portion 10b is lowered, lowering being performed once more with the help of the arms 21, and is then moved towards the top end of said first portion 10a that is suspended from the retaining and holding device of the invention, as shown in FIG. 6C. The new string or pipe portion is fitted at its top end with a said first junction forging 1 and at its bottom end with a junction forging $1_1$ having no protuberance.

A welding machine 24 is then installed as shown in FIG. 6D and welding is performed. The assembly constituted by the two assembled-together pipe portions is then raised to a few tens of centimeters, thereby enabling the second collar 3 or intermediate collar to be removed followed by the top collar or said first collar 1, thus releasing a passage to allow said pipe to be lowered towards the sea bottom through a distance corresponding to the length of the string, in order to begin a new cycle of assembling the following string.

The through diameter of said second collar 3 is greater than the maximum outside diameter of the pipe, thus enabling the pipe to be lowered without any interference. In the event of a connector, an anode, or a flange for installing on the periphery of the pipe being passed, said third collar 3 is advantageously also removed so as to leave a larger passage.

By way of example, a pipe-in-pipe type pipe laid in a depth of 2200 m of water presents the following characteristics. The outer pipe has a diameter of 403 mm and a thickness of 23.8 mm, the inner pipe has a diameter of 254 mm and a thickness of 27 mm, the annular space in the pipe-in-pipe being 22 mm wide, thereby giving the forging a distance between its outside diameter and its inside diameter, i.e. a thickness of 72.8 mm in its main portion, to which value it is necessary to add the 20 mm thickness of the protuberance. The resulting tension of the catenary formed by the suspended pipe while it is being laid is about 1200 t, which corresponds to a resulting Von Mises stress in the conical plane 1b of 280 MPa which, for steel presenting a strength of 450 MPa, corresponds to working at 62% of the elastic limit. This high percentage is acceptable from a safety point of view only because of the ball-joint 5 which ensures that the stresses are distributed perfectly uniformly over the entire periphery of the protuberance. This is due to the fact that the contacting faces of the forgings and of the various collars are machined so as to ensure good load transfer and uniform stress levels: it is not possible to use any as-forged contact surface, or any machining that is of mediocre quality in terms of shape or surface state.

The invention claimed is:

1. A floating support including a retaining and holding device for retaining and holding an undersea pipe in suspension from said floating support, the pipe including a first forging in the form of a body of revolution welded to the top end of said pipe and forming an internal tubular pipe section of substantially the same diameter as the diameter of said pipe, the support being characterized in that said retaining and holding device comprises:
   a) a said first forging including a first peripheral radial protuberance on its outside surface, said first radial protuberance having on its underside a first contact surface of revolution;
   b) at least one first collar releasably locked around and against said first forging via the underface of said first protuberance at said first contact surface of said first protuberance, said first contact surface co-operating by bearing against a second contact surface of revolution of said first collar, said first collar forming a second radial protuberance of diameter that is greater than the diameter of said first protuberance, said second protuberance being suitable for retaining the ends of gripper arms installed on said floating support and serving to raise or lower said pipe in translation relative to said floating support substantially along the axis $Z_1$-$Z_1'$ of said pipe at its top end; and
   c) support means resting on a stationary platform having a first passage through which the pipe passes, said platform being secured to said floating support, said support means and said platform surrounding said pipe and directly or indirectly supporting said first collar, said first collar presenting a third contact surface of revolution on the underface of said first collar and co-operating by bearing directly or indirectly on said support means, said support means including load transfer and rotary joint means enabling the axis $Z_1$-$Z_1'$ of said pipe to be guided in inclination at said top end within a virtual cone having an angle at the apex ($2\alpha$) of less than 10° relative to an axis ZZ' perpendicular to said platform, while ensuring that loads are distributed substantially uniformly over all of said contact surfaces when said pipe exerts non-uniform thrust on said contact surfaces and said support means, thereby causing said inclination of the pipe.

2. The floating support according to claim 1, wherein said first protuberance presents a thickness of 10 mm to 50 mm.

3. The floating support according to claim 1, wherein said rotary joint means comprise joint means having a self-centering effect on the pipe when the pipe is inclined by movements of said floating support.

4. The floating support according to claim 1, wherein said support means comprise a support part forming a body of revolution secured to said floating support and resting on said platform, said support part having a central first through orifice of diameter greater than the diameter of said first protuberance, and said load transfer and rotary joint means enabling the axes of said first forging, said first collar, and said contact surfaces to rotate freely within the limit of said cone having an angle at the apex ($2\alpha$) relative to the axis ZZ' of said support part and of said central first through orifice.

5. The floating support according to claim 1, wherein said load transfer and rotary joint means comprise flexible joint means with a laminated abutment forming a body of revolution having a plurality of elastomer layers interposed between rigid reinforcing layers defining surfaces of revolution at rest having the same axis as the axis of revolution ZZ' of said first forging, said support part, and said first collar.

6. The floating support according to claim 5, wherein said flexible joint means is of the ball-joint type including said spherical laminated abutments.

7. The floating support according to claim 1, wherein said load transfer and rotary joint means and said support means are constituted by a plurality of hydraulic actuators regularly distributed around said first passage of said platform and around said pipe, the actuator cylinders resting on said platform around said first passage through which the pipe passes, said ends of the actuator rods directly or indirectly supporting said third contact surface of said first collar, said actuator cylinders being interconnected so that fluid can be exchanged between them in order to establish differential movements in translation of said rods of the various actuators when non-uniform thrust is exerted on said ends of the actuator rods.

8. The floating support according to claim 4, wherein said support part forming a body of revolution and said load transfer and rotary joint means comprise a type of mechanical ball-joint constituted by two rigid parts, namely a bottom part forming a body of revolution resting on said platform, and a top part forming a body of revolution, said first collar bearing directly or indirectly on said top part, said bottom part presenting a concave top contact surface of spherical section slidably co-operating with a complementary convex surface of spherical section constituting the bottom surface of said top part of said support part, at least one of said concave and convex surfaces having an anti-friction coating.

9. The floating support according to claim 1, wherein said first and second contact surfaces are frustoconical surfaces of revolution inclined relative to the axis $Z_1$-$Z_1'$ of said first forging by an angle ($\beta$) lying in the range 30° to 60°.

10. The floating support according to claim 1, wherein said third contact surface of said first collar is a frustoconical surface of revolution having the same angle of inclination as said first and second frustoconical contact surfaces.

11. The floating support according to claim 1, wherein said first collar co-operates indirectly with said support means via a second collar that is releasably locked around the outside surface of a portion of said first collar including said third contact surface, said second collar including a second contact surface of revolution on which said third contact surface of said first collar bears, said second collar presenting a maximum outside diameter and a through inside diameter that are larger than the maximum outside diameter and the through inside diameter respectively of said first collar, said second collar presenting in its bottom portion a fifth contact surface of revolution co-operating directly or indirectly by bearing against a sixth contact surface of revolution at the top portion of said support means.

12. The floating support according to claim 11, wherein a third collar locked around at least a bottom portion of a said second collar, said third collar including a top seventh contact surface of revolution on which said fifth contact surface of revolution of said second collar comes to bear, and a bottom eighth contact surface of revolution bearing directly against said sixth contact surface at the top portion of said support means, said third collar presenting a maximum outside diameter and a through inside diameter that are greater than the maximum outside diameter and the through inside diameter respectively of said second collar.

13. The floating support according to claim 12, wherein said first, second, and where appropriate third collars are made up of a plurality of portions forming angular circular-collar sections, said angular collar sections or portions being releasably locked together at adjacent portions, with the other portions being hinged to one another at each end so as to enable said collar to be open after it has been releasably unlocked.

14. The floating support according to claim 1, wherein said pipe is a set of PiP type coaxial pipes and said first forging is a junction part at the end of a first portion of the coaxial pipe assembly for assembling, said junction parts having outer and inner branches forming bodies of revolution that define two annular cavities, with the outer and inner first branches being welded respectively to said outer and inner pipes of said first portion of said set of two coaxial pipes, said first protuberance being formed on the outside surface of a full-thickness zone between the two annular cavities, and said first inner branch preferably being longer than said first outer branch.

15. The floating support according to claim 1, comprising a device for connecting and laying successive portions of an undersea pipe from said floating support, comprising a J-lay tower, the support being characterized in that said platform on which said support means rests is situated in a bottom portion of said tower perpendicularly to the axis of said tower, and said load transfer and rotary joint means allow a said inclination to take place within a said cone of axis corresponding to the axis of said tower.

16. A method of retaining and holding a pipe on a support according to claim 15, wherein the following steps are performed:
   a) welding a said forging including a said first protuberance to the top end of said pipe; and
   b) locking a said first collar so that it bears against said first contact surface of said first protuberance; and
   c) lowering a first pipe portion including a said first forging with a said first protuberance at the top end of said first pipe portion using said gripper arms until it comes into abutment on said support means, said first collar being locked against said first protuberance, said gripper arms retaining said first collar via the underface of a said second protuberance.

17. A method of connecting together two pipe portions and of laying the pipe as connected together in this way at sea from a floating support having a J-lay tower according to claim 15, wherein the following steps are performed:
   1) lowering a first pipe portion including a said first forging with a said first protuberance at the top end of said first pipe portion by using said gripper arms so that it comes to bear against said support means, a said first collar being locked against said first protuberance, said gripper arms retaining said first collar via the underface of a said second protuberance, where appropriate; and
   2) lowering a second pipe portion including a said first forging with a said first protuberance at its top end by using said gripper arms co-operating with said first collar locked around said first forging, until the bottom end of said second pipe portion is positioned in abutment with the top end of said first forging at the top end of said first pipe portion; and
   3) connecting said first and second forgings together; and
   4) lifting the connected-together pipe a little using said gripper arms and unlocking and removing at least said first collar; and
   5) lowering the connected-together pipe into the sea through the orifices of said first and second through orifices of said support means and of said platform.

* * * * *